(12) United States Patent
Soula et al.

(10) Patent No.: US 8,708,279 B2
(45) Date of Patent: Apr. 29, 2014

(54) COMPOSITE STRUCTURAL MEMBER WITH PROGRESSIVE RIGIDITY

(75) Inventors: Denis Soula, Toulouse (FR); Julien Guillemaut, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 265 days.

(21) Appl. No.: 13/109,448

(22) Filed: May 17, 2011

(65) Prior Publication Data

US 2011/0299993 A1 Dec. 8, 2011

(30) Foreign Application Priority Data

May 20, 2010 (FR) ...................................... 10 53922

(51) Int. Cl.
*B64C 1/00* (2006.01)
(52) U.S. Cl.
USPC ..................... 244/123.8; 244/123.1; 244/119; 244/120; 244/121
(58) Field of Classification Search
USPC .............. 244/119, 120, 121, 123.1, 125, 126, 244/133
See application file for complete search history.

(56) References Cited

U.S. PATENT DOCUMENTS

| | | | |
|---|---|---|---|
| 4,606,961 A * | 8/1986 | Munsen et al. | 428/119 |
| 6,372,072 B1 | 4/2002 | Healey | |
| 7,138,345 B2 * | 11/2006 | Wadahara et al. | 442/179 |
| 7,491,289 B2 * | 2/2009 | Westre et al. | 156/300 |
| 2002/0195524 A1 * | 12/2002 | Amaoka et al. | 244/123 |
| 2005/0163975 A1 * | 7/2005 | Chen et al. | 428/192 |
| 2006/0222837 A1 * | 10/2006 | Kismarton | 428/297.4 |
| 2007/0244590 A1 | 10/2007 | Menayo et al. | |
| 2008/0128553 A1 * | 6/2008 | Brown et al. | 244/124 |

FOREIGN PATENT DOCUMENTS

| | | |
|---|---|---|
| EP | 1 840 775 A1 | 10/2007 |
| WO | WO 00/34031 | 6/2000 |
| WO | WO 04/001115 A1 | 12/2003 |
| WO | WO 2009/133382 A1 | 11/2009 |
| WO | WO 2009133382 A1 * | 11/2009 ............. G06F 17/50 |

OTHER PUBLICATIONS

French Preliminary Search Report issued Jan. 4, 2011, in French 10 53922, filed May 20, 2010 (with English Translation of Category of Cited Documents).
David B. Adams et al., "Optimization and Blending of Composite Laminates Using Genetic Algorithms with Migration," Mechanics of Advanced Materials and Structures, vol. 10, Jul. 1, 2003, pp. 183-203.

* cited by examiner

*Primary Examiner* — Tien Dinh
*Assistant Examiner* — Justin Benedik
(74) *Attorney, Agent, or Firm* — Oblon, Spivak, McClelland, Maier & Neustadt, L.L.P.

(57) ABSTRACT

A composite structural member with fiber reinforcement comprising a plurality of layers oriented relative to a longitudinal direction of said member in directions including 0°, 90° and +/−θ, the relative proportion of layers in one of these orientations being variable along a transverse direction of said member so as to spatially adjust the rigidity of the member according to a defined distribution of mechanical stresses along this transverse axis. The rigidity of the member is adapted locally to the stress system so as to dissipate the force flux over the entire volume of said member.

9 Claims, 2 Drawing Sheets

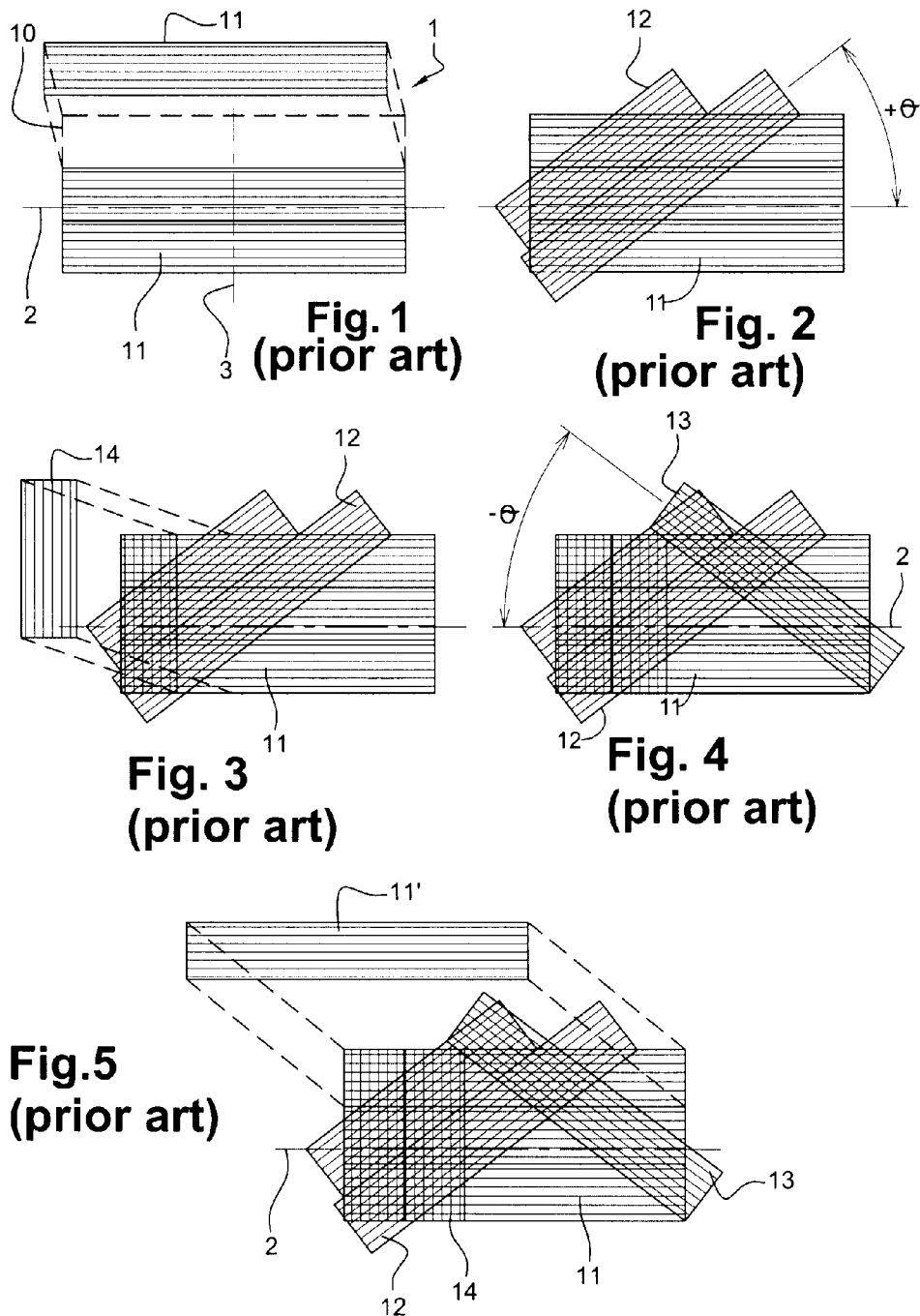

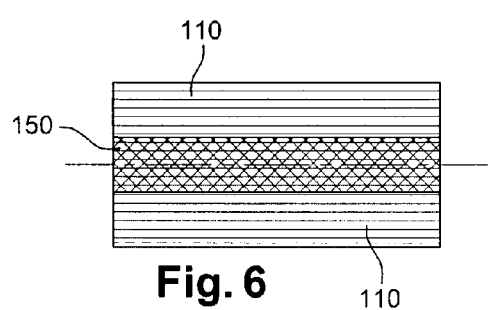
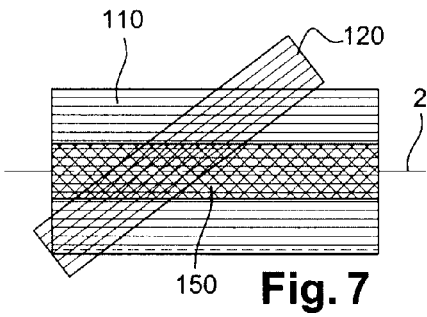
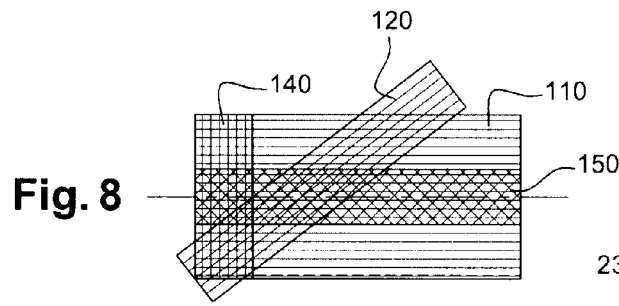
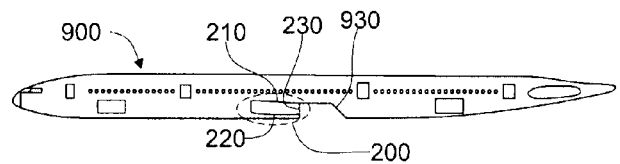
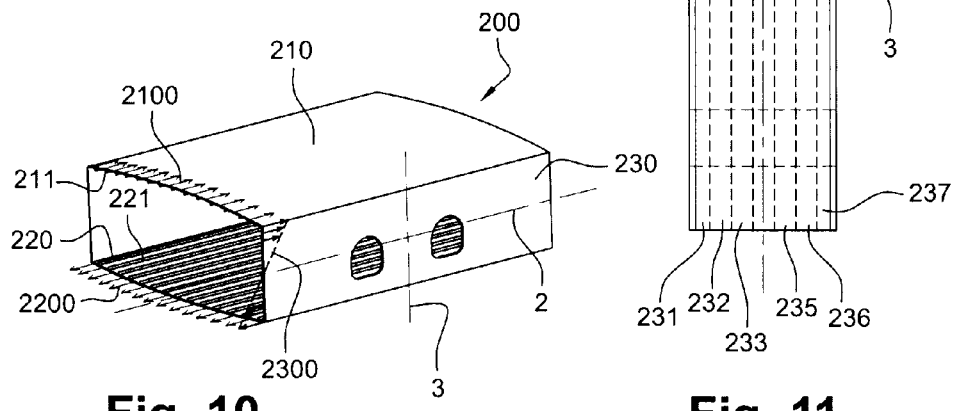

COMPOSITE STRUCTURAL MEMBER WITH PROGRESSIVE RIGIDITY

The invention relates to a composite structural member with fiber reinforcement and its application in the production of a wing box for aircraft.

The rigidity of a composite member relative to a force flux depends on the orientation of the reinforcing fibers with respect to the stresses it is subjected to. Thus, such a member, loaded by forces parallel to a longitudinal direction and in opposite directions on two of its surfaces substantially parallel to said longitudinal direction, will be from an overall point of view subjected to shearing. However, the resistance of the member to shearing is mainly obtained by fibers oriented at +/−45° relative to the longitudinal direction, whereas its rigidity in regard to this longitudinal direction is obtained by fibers oriented in a direction substantially parallel to it. Thus, an optimum fiber orientation for the member's resistance to shear will not be optimal with regard to its ability to transmit the longitudinal forces applied to its loaded surfaces. In other words, the optimal stacking sequence of ply, each ply, or layer, being characterized by the orientation of the fibers it contains, relative to the overall stress of a composite member with fiber reinforcement, is not optimal with regard to its overall rigidity. However, reduced rigidity results in an increase in the stress applied to the member; said increase is countered by oversizing, which itself generates mass.

This aspect is therefore proportionately more significant for large, thick, and highly loaded members that are used in a field where mass criteria are of paramount importance, such as aeronautics.

Thus there is a need for composite members with fiber reinforcement that are able to dissipate over their entire volume the loads they are subjected to as a whole and being able at the same time to resist these loads at a local level.

To remedy the deficiencies of the prior art, the invention proposes a composite structural member with fiber reinforcement comprising a plurality of layers oriented relative to a longitudinal direction of said member in directions including 0°, 90° and +/−θ, the relative proportion of layers in one of these orientations being variable along a transverse direction of said member so as to spatially adjust the rigidity of the member according to a defined distribution of mechanical stresses along this transverse axis.

Thus the rigidity of the member is adapted not only locally to the stress system, but also from an overall perspective with regard to its ability to dissipate the overall force applied.

Advantageously, at least one ply of fibers oriented in a +/−θ direction is formed of continuous fibers extending from one side of the member to the other over its entire surface. These layers perform the load transfer and allow the forces to be dissipated over the entire surface of the member.

The thickness of the member is constant, as is the number of layers forming the laminate; the only change is the proportion of layers containing fibers in one or more defined orientations. In this case, all the layers containing fibers oriented at an angle of +/−θ cannot be extended over the entire surface of the member.

Advantageously, θ is chosen to be 45° for a member whose main overall stress is shear.

The invention also relates to an aircraft wing box comprising:
- a stiffened upper surface panel and a stiffened lower surface panel;
- a spar made of a composite member according to any one of the embodiments above and extending transversely between the upper and lower surface panels of the box, the longitudinal direction of the spar being substantially parallel to the stiffeners of the upper and lower surface panels
- said spar is connected completely to the upper and lower surface panels Thus, the wing box's spar will present an optimal structure for transmitting longitudinal forces applied to the stiffened upper and lower surface panels over the entire volume of the spar, these being generally subjected to shear stress. The thickness of said spar can thus be optimized, just like the mass of the wing box.

Advantageously the spar comprises a 40% to 50% proportion of fibers oriented at 0° in areas, known as the extremities, with a width less than a quarter of the total width of the spar starting from its connections with the upper and the lower surface panel.

Thus the higher proportion of fibers oriented at 0° in the vicinity of the spar's connections with the upper and lower surface panels, mainly subjected to traction and compression stresses along the longitudinal axis of the box, allows its rigidity to be adapted in these extremities so that it substantially matches the rigidity of the panels according to the same stresses. This configuration allows mass to be saved not only on the spar but also on the panels, through the influence of the spar's increased rigidity on the rigidity of the entire box.

Advantageously, the spar comprises, between the two extremity areas, intermediate areas in which the proportion of fibers at 0° decreases from one area to another, going from the extremity area toward the central longitudinal axis of the spar. In this way the high rigidity in traction/compression on the extremities near the upper and lower surface panels is gradually reduced approaching the central part of that spar where there is a stacking of layers in which the combination of fiber orientations is favorable for the resistance to shear, i.e. with substantially equivalent fiber content in all four directions. This graduation allows the structure to have better resistance in regard to the stresses applied throughout the box. The extremity areas with a majority of fibers at 0° withstand the traction/compression loads, which thus minimally stress the spar's central area which is optimized in regard to shear stresses.

Advantageously, the spar of the wing box according to the invention comprises an area known as the central area, extending either side of the central longitudinal axis of that spar and comprising the same proportion of fibers in orientations 0°, 90° and +/−θ. Thus, this central area is optimized to withstand shear stresses.

Such a wing box will be advantageously integrated into an aircraft whose mass it will reduce compared to the solutions of the prior art. The constant thickness of the spar also simplifies the installation of systems on this spar.

The invention will now be described more precisely in the context of its preferred embodiments, which are in no way limiting, shown in FIGS. 1 to 11 in which:

FIGS. 1 to 5, which relate to prior art, represent schematically in a top view the different stages of laying up a composite member;

FIGS. 6 to 8 show schematically in a top view the different stages of laying up a composite member according to an embodiment of the invention that allows a member of uniform thickness to be obtained;

FIG. 9 shows a side view of an aircraft including a wing box;

FIG. 10 shows, in perspective and in a front view, a wing box comprising a spar according to a particular embodiment of the invention;

and FIG. 11 shows in a front view a wing box spar according to an example of realization of the invention.

FIG. 1: according to an example of realization of a composite member (1) with progressive layup, relative to the prior state of the art, the laying up is realized with strips or bands (11, 12, 13, 14) containing unidirectional fibers, for example pre-impregnated with a thermosetting resin, deposited on a mandrel, for example using an automatic tape laying machine, and cut to the contour (10) of the member. In this example of realization, a first ply, or layer, is formed by laying up various strips (11) whose fibers are oriented parallel to the member's longitudinal axis (2), called at 0°, said bands being juxtaposed along the transversal axis (3) of said member.

FIG. 2: still according to this example of realization, a second ply is superimposed on the first by laying up unidirectional bands (12) oriented at an angle +θ relative to the longitudinal axis. Several bands are juxtaposed so as to cover the surface of the member (1) (only two bands are shown here). In this way, all the fibers in these bands extend from one side to another of the contour (10) of the member. As the strips are made of fibers pre-impregnated with a thermosetting resin, its tackiness ensures the relative stability of the different layers.

FIG. 3: relating to the same example of realization, unidirectional bands (14) are superimposed on the previous ones, their fibers being oriented in a direction called at 90°, perpendicular to the longitudinal axis (2) of the member. A plurality of such unidirectional bands (14) is thus juxtaposed along the longitudinal axis (2) so as to cover the surface of the member (only two bands are shown).

FIG. 4: still according to the same example, a ply of fibers oriented in a direction −θ is superimposed on the previous ones by laying unidirectional bands (13), oriented in this direction and juxtaposed so as to cover the entire surface of the member.

FIG. 5: a local reinforcement is obtained by laying a unidirectional band (11'), here oriented at 0°, over only one part of the member. Then, other layers are superimposed on the previous ones, always by laying unidirectional bands in defined orientations so as to cover the entire surface of the member.

After the layup, the reinforced area will comprise at least one more ply oriented at 0° compared to the rest of the member. The proportion of layers at 0° will be higher in this area, and similarly its rigidity in regard to the stresses oriented along the longitudinal axis (2). The member's rigidity to these stresses will therefore be progressive along a transverse axis (3).

After laying up, according to this example of realization, the member is compacted and cured in an autoclave to give it its final mechanical properties and, if necessary, trimmed by any means known to those skilled in the art.

The region reinforced in regard to longitudinal stresses is thicker than the rest of the member because it includes at least one more ply. Such a reinforcement must be inserted between the folds extending over the entire surface of the member so that the curving of the fibers crossing this overthickness remains within acceptable tolerances.

FIG. 6: according to an example of realization of a composite member according to the invention, the layup is realized with multi-axis bands (110, 140, 150), i.e. that comprise a superposition of several layers containing fibers oriented in defined directions. Thus, in this non-limiting example, the band (150) laid on the central part of the member comprises fibers oriented at 0° and +/−θ. The bands (110) juxtaposed on either side of the previous band comprise the same number of layers, but only fibers oriented at 0°. Thus, the proportion of fibers oriented at 0° is significantly greater in the bands laid on either side of the central strip. The multi-axis bands can be formed from dry fibers or fibers pre-impregnated with a thermosetting resin or a thermoplastic resin by adapting the layup means to these types of materials.

FIG. 7: at least one ply extending over the entire surface of the member is superimposed on the previous ones by laying up bands (120), e.g. unidirectional, the laying up being realized in a direction +θ and/or −θ.

FIG. 8: the layers are also laid up with a direction of fibers at 90° relative to the longitudinal axis, for example by juxtaposing unidirectional strips (140) oriented in that direction.

According to this layup method, the outer parts of the member comprise a higher proportion of fibers oriented at 0°, but have the same thickness as the rest of the member. It is essential that the layup includes the realization of ply extending over the entire surface of the member, the fibers of which are oriented at 90° or +/−θ, where θ is other than 0°, so as to ensure the member's cohesion along the transverse axis (3).

FIG. 9: a wing box (200), also commonly referred to as the "central box" or "center wing box", is a fuselage element of an aircraft (900) that connects said fuselage to the aircraft wing. According to this example of realization the central box is located in the fuselage in a position contiguous with the landing gear housing used to house the central landing gear in flight.

FIG. 10: according to an example of realization, an aircraft wing box (200) comprises an upper surface panel (210), said panel being stiffened by longitudinal stiffeners (211), and a lower surface panel (220) also stiffened by longitudinal stiffeners (221). These two panels are mechanically coupled by a spar (230) extending longitudinally and connected completely to each of said panels along its transverse extremities. The spar (230) also delimits the landing gear housing (930) of the aircraft (900). The landing gear housing of an aircraft is an area in which many systems are installed, and in particular routings for hydraulic or electrical ducts. Installing these systems and these ducts is much easier if the inner walls of the landing gear housing, including the spar (230) of the wing box, have a simple shape, notably flat.

In flight, lift subjects the upper surface panel (210) mainly to compression stress (2100) while the lower surface panel (220) is mainly subjected to tension stress (2200). These stresses are taken up in said panels, in particular by the longitudinal stiffeners (211, 221). As the spar (230) is connected to the two panels (210, 220) it is mainly subjected to shear stress (2300), predominantly at the central longitudinal axis (2). According to the prior state of the art, a composite member subjected to shear stress is laid up in an optimal way by distributing the fibers equally in directions 0°, 90°, and +/−45°, according to a layup known as "iso". However, in the areas of the connections with the upper and lower surface panels, this layup leads to a reduced local rigidity of the spar in comparison with the rigidity of the panels, which are optimized to withstand traction/compression stresses. Thus, to ensure the compatibility of the strain ratios of the spar (230) and panels (210, 220) at their connection interfaces, it is advantageous to increase the spar's rigidity in these interface areas. By strengthening these areas, and making them less deformable in regard to these stresses, the inertia of the spar in relation to bending moments about an axis perpendicular to the longitudinal (2) and transverse (3) axes is increased without changing its shape, which provides an increase in rigidity, and hence a saving in mass. In contrast the spar's central area, which makes only a slight contribution to the overall inertia of the housing, is advantageously laid up by an iso layup, thereby taking up the shear forces best. The passage from the areas of the connections with the panels to the central area must be done gradually so as to adapt in the best way to the gradual change in the stresses applied throughout the height of the spar.

FIG. 11: according to an example of realization, the outer areas (231, 237) connected to the lower surface panel (220) and upper surface panel (210) are laid up with a fiber content of 50% at 0°, 20% at 45°, 20% at −45° and 10% at 90°, and the central zone (234) comprises 25% of fibers in each of these directions. Between the two, the rigidity is gradually adapted by reducing the proportion of fibers at 0° and correspondingly increasing the proportion of fibers at +/−45° and 90°.

Thus, the area (232, 236) immediately following the area of the connection with the lower surface panel or upper surface panel will comprise 41% fibers at 0°, 22% fibers at 45°, 22% fibers at −45° and 15% fibers at 90°.

Then, the areas (233, 235) located immediately either side of the central area will comprise 34% fibers at 0°, 23% fibers at 45°, 23% fibers at −45° and 20% fibers at 90°.

The thickness of the spar is constant and its external shape remains flat which, apart from the weight savings obtained by the layup method that is the subject of the invention, facilitates the installation of systems in the area of the central landing gear housing.

The above description clearly illustrates that through its various features and their advantages the present invention realizes the objectives it set itself. In particular it allows the rigidity of a wing box spar to be adapted so as to optimize its bending inertia, solely through the distribution of reinforcements without creating complex shapes. Thus the mass of such a wing box is reduced and its manufacture is simplified compared to the prior state of the art.

The invention claimed is:

1. A composite structural member for an aircraft with fiber reinforcement comprising:
a plurality of layers of fibers oriented relative to a longitudinal direction of the composite structural member of the aircraft at angles including 0°, 90° and +/−θ, a relative proportion of fibers in at least one of these orientations is varied along a transverse axis of the composite structural member so as to spatially adjust rigidity of the composite structural member according to a defined distribution of mechanical stresses along this transverse axis,
wherein at least one layer of fibers oriented at a +/−θ angle is formed of continuous fibers extending from one side of the composite structural member to another side over an entire surface of the composite structural member,
wherein a thickness of the composite structural member is constant along the transverse axis, and
wherein 0°<θ<90°.

2. The composite structural member according to claim 1, wherein θ=45°.

3. An aircraft wing box comprising:
a stiffened upper surface panel and a stiffened lower surface panel; and
a spar made of the composite structural member according to claim 1, extending transversely between the upper surface panel and the lower surface panel of the box, the longitudinal direction of the spar being substantially parallel to the stiffeners of the upper surface panel and the lower surface panel,
wherein the spar is connected completely to the upper surface panel and the lower surface panel.

4. The wing box according to claim 3, wherein the spar comprises a 40% to 50% proportion of fibers oriented at 0° in extremity areas, with a width of the extremity areas being less than a quarter of the total width of that spar starting from connections thereof with the upper surface panel and with the lower surface panel.

5. The wing box according to claim 4, wherein the spar comprises, between the extremity areas, intermediate areas in which a proportion of fibers at 0° decreases from one area to another, going from the extremity areas toward a central longitudinal axis of that spar.

6. The wing box according to claim 5, wherein the spar comprises, between the intermediate areas, a central area, the central area extending along the central longitudinal axis of that spar and comprising the same proportion of fibers in orientations 0°, 90° and +/−θ.

7. An aircraft comprising the wing box according to claim 6.

8. The wing box according to claim 4, wherein the spar comprises a 50% proportion of fibers oriented at 0°, a 20% proportion of fibers oriented at 45°, a 20% proportion of fibers oriented at −45°, and a 10% proportion of fibers oriented at 90° in the extremity areas.

9. The wing box according to claim 6, wherein the spar comprises a 25% proportion of fibers oriented at 0°, a 25% proportion of fibers oriented at 45°, a 25% proportion of fibers oriented at −45°, and a 25% proportion of fibers oriented at 90° in the central area.

* * * * *